Aug. 8, 1950    S. A. SCHELKUNOFF    2,518,383

MULTIRESONANT CAVITY RESONATOR

Filed Aug. 1, 1945

INVENTOR
S. A. SCHELKUNOFF
BY E. V. Griggs
ATTORNEY

Patented Aug. 8, 1950 2,518,383

UNITED STATES PATENT OFFICE 2,518,383

MULTIRESONANT CAVITY RESONATOR

Sergei A. Schelkunoff, New York, N. Y., assignor to Bell Telephone Laboratories, Incorporated, New York, N. Y., a corporation of New York Application August 1, 1945, Serial No. 608,287

7 Claims. (Cl. 178—44)

Figure 1:
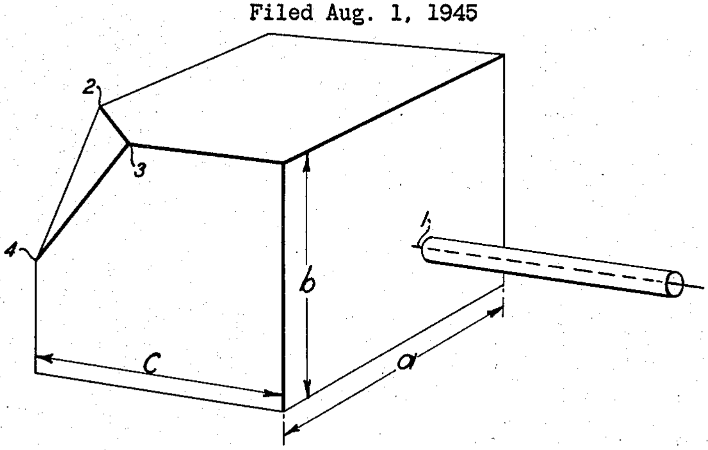

This invention relates to multi-resonant selective devices and more particularly to cavity resonators having a multi-resonant response at frequencies which are relatively closely spaced throughout a desired band.

An object of the invention is to provide a microwave selector which will exhibit a substantially uniform response over a considerable band of frequencies.

Another object of the invention is to increase the Q of a multi-resonant cavity over a relatively wide band of frequencies.

An additional object of the invention is to provide a microwave resonator which shall have a high volume to surface ratio and a relatively large number of different natural resonance frequencies.

Cavity resonators resemble in their electrical action the well-known low frequency networks which are commonly described as having a plurality of degrees of freedom. Such cavity resonators exhibit a frequency selective response for electromagnetic waves. In fact, they exhibit a plurality of responses at different frequencies which are respectively determined primarily by the various dimensions of the resonator. At each response frequency the selectivity may be very high so that the effective response band is narrow and the frequency separation between maximum responses is relatively high. Devices with such response characteristics are exceptionally useful in those applications of microwave transmission systems in which a high order of selectivity is desirable.

In some instances as, for example, in test sets for radar or for microwave transmitters it is desirable to retain the low dissipation characteristic accompanying high selectivity in order to build up strong fields which may persist after the exciting force has died away thus serving to store up energy for measuring purposes. If, however, the very narrow response band which high selectivity connotes is widely separated from the next adjacent response band, a very small percentage variation in the exciting frequency may cause the exciting oscillations to be lost in the regions between the response bands. It is an object of the present invention to retain the low damping characteristic of high selectivity but to insure having a sufficiently large number of response bands within a given frequency range or what is the same thing having a relatively small separation between the maximum response frequencies throughout the given frequency range. The energy of a short square pulse of microwaves is not all concentrated in a single frequency but spreads out over a band of $2/l$ megacycles wide and centered about the nominal frequency where $l$ is the pulse width in microseconds. A pulse of the order of a half microsecond in length will therefore have a frequency spectrum four megacycles wide between first minima. Thus "holes" in the response of a cavity of the order of four megacycles in width may cause the ringtime for half microsecond pulses to be greatly decreased if the major portion of the band coincides in frequency with the "hole." It is desirable for such impulses that the resonator have responses not more widely separated than four megacycles.

In general any symmetry about an axis in a cavity resonator reduces the number of electromagnetic wave response frequencies for the reason that the oscillations which occur in directions perpendicular to that axis are all reduced to the same frequency. This phenomenon of reduction of the number of natural frequencies by symmetry is commonly known as "degeneracy" and militates against securing a large number of different frequency responses in a given frequency range. In accordance with this invention, therefore, the three major orthogonal dimensions of the cavity volume are made to differ by the order of a quarter-wavelength in free space at the desired frequency thus reducing the symmetry of the volume.

In the interest of retaining low dissipation it is advantageous to provide walls which are relatively large and which will therefore support relatively large energy fields without requiring excessive internal potential gradients. Moreover, the fewer the walls the simpler and more economical is the structure, and the easier it is to provide oppositely positioned reflectors which are parallel. It might seem that on the contrary a near infinity of small, non-parallel, and irregularly arranged faces would be best suited to provide a structure to achieve the desired goal. However, while theoretically this might be conducive to an increase in the number of response frequencies, the surface losses accompanying the large number of traverses before the wave fronts arrive again at a reinforcing position are such as inordinately to increase the damping and thus to defeat the whole purpose of the structure which is dependent upon low damping. Accordingly, the invention contemplates making the cavity resonator as large as it economically may be made and providing orthogonally directed principal walls to constitute a parallelepipedon, the number of walls being increased beyond the normal six by cutting off one or more of the eight corners by intersecting planes and closing each of the resulting openings by a plane triangular conducting wall. Moreover, these triangles may be of different dimensions in different directions and may differ from each other in dimension.

Since the Q of a cavity resonator, other circumstances remaining the same, tends to increase with increase in volume and to decrease with increase in surface or boundary area, it is desirable where high Q is important to maintain the volume to surface ratio high. For this reason the structure should preferably be free from reentrant or depression areas since these increase the surface and decrease the volume.

Figure 2:
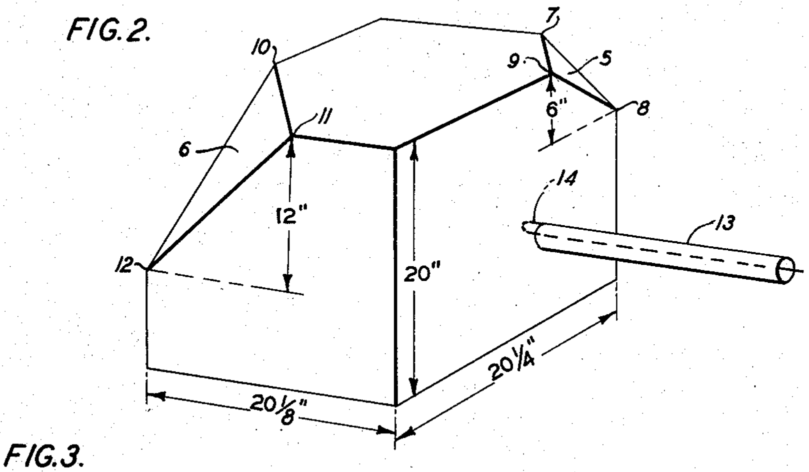
Figure 3:
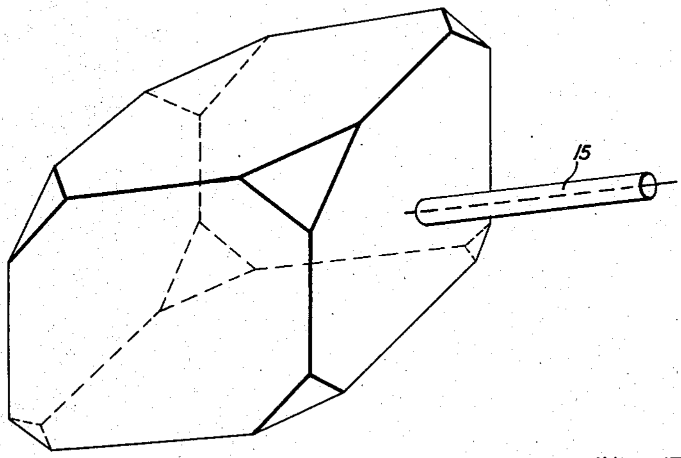

In the drawing:

Fig. 1 portrays a cavity resonator comprising an orthogonal parallelepipedon with one corner cut off in a diagonal plane;

Fig. 2 is a modification of the structure of Fig. 1 in which two corners diagonally opposite on the same major face are removed; and Fig. 3 is a modification in which each of the eight corners is cut off.

Referring to Fig. 1, there is illustrated a cavity resonator comprising a closed hollow chamber having the conformation of an orthogonal parallelepipedon with length, height and breadth dimensions $a$, $b$, and $c$, respectively. The walls of the chamber may consist of electrically conducting material or may be structural supporting plates of any character whatever with an interior lining of highly electrical conducting material. The dimensions $a$, $b$ and $c$ taken in pairs should preferably be incommensurate and should differ from each other by the order of about a quarter-wavelength in free space at the desired frequency. The resonant frequencies of such a resonator are given by the following formula:

$$f=\tfrac{1}{2}v\sqrt{\frac{m^2}{a^2}+\frac{n^2}{b^2}+\frac{p^2}{c^2}}$$

where $v$ is the velocity of electromagnetic waves in the chamber and $m$, $n$, $p$ are integers, not all equal to zero. If $a$, $b$ and $c$ are incommensurate in pairs, we have the greatest number of distinct resonance frequencies. If $a$ and $b$ are commensurate, some of these frequencies coalesce. If $a$ is equal to $b$, many more coalesce since a permutation of $m$ and $n$ ceases to affect the value of $f$. For a cube all permutations of $m$, $n$, $p$ correspond to the same resonant frequency.

In one example in which the mid-band frequency response is of the order of 10 centimeters the dimension $b$ was made about an inch greater than $a$ and an inch less than $c$, each of these dimensions $a$, $b$, $c$ corresponding to approximately three or four wavelengths at one of the response frequencies. However, when the band width desired is not so large, closer spacing of the response frequencies may be had by reducing the differences in the dimensions. In one such apparatus, also useful in the 10-centimeter wavelength range, the dimensions $a$, $b$, $c$ were respectively 12 inches, 12⅜ inches and 12¾ inches.

In order to excite electrical oscillations of each of the various natural modes of oscillation, it is desirable to couple the exciting circuit to the interior electromagnetic field in a non-symmetrical manner. For this reason a half dipole coupler 1 is introduced at a point which is below and to the right of the center of the end face of the resonator. It may, if desired, extend at other than a perpendicular direction to the end face of the resonator but in this figure it is shown in the perpendicular position.

Both theory and practice show that if the symmetry of the resonator be reduced, more different frequency modes of oscillation will appear. Accordingly, if one corner be removed along a diagonal plane and the opening be closed by a triangular conducting plate as shown at 2, 3, 4, the number of effective responses may be materially increased and the frequency spacing between effective resonances may be greatly reduced. For this purpose it is desirable to use such an angle of inclination of the corner plate 2, 3, 4 that no two sides of that triangle are equal.

Fig. 2 discloses a modification of the apparatus of Fig. 1 in which two corners are cut off and replaced by corner plates 5 and 6 respectively. In this structure which is also employed for waves of the 10-centimeter range, the principal dimensions of the resonator are respectively 20 inches, 20⅛ inches and 20¼ inches. In this structure the corner 5 has equal sides and each of its apices 7, 8 and 9 is distant 6 inches from the common corner point at which the three orthogonal faces originally met. The corner plate 6 has dimensions twice those of corner plate 5 or, in other words, its apices 10, 11 and 12 are distant 12 inches from the common intersection point of the three orthogonal faces.

As in the case of Fig. 1, the transmission system for exciting the internal electromagnetic field comprises a coaxial conductor 13 but, in this instance, an electromagnetic loop 14 is employed in lieu of the half dipole. In this structure, as in that of Fig. 1, the coupling to the internal electromagnetic field is located at a point removed from the center of the longitudinal face and the plane of the loop 14 may preferably be at an angle to the orthogonal planes of the resonator walls.

Fig. 3 shows a further modification similar in other respects to the disclosures of Figs. 1 and 2 but in which the eight corners of the orthogonal parallelepipedon are each cut off. Preferably no two of these eight corners are identical in dimensions. The exciting circuit 15 may correspond in all respects to that of Fig. 1. It will, of course, be understood that the exciting circuits serve also as the output circuits in the case of "phantom targets" or "echo boxes."

In this specification and the claims the expression incommensurate is used with its usual connotation that two lengths are incommensurate if they cannot be subdivided into integral numbers of equal parts. Two lengths are commensurate where they can be so subdivided and where accordingly their ratio may be expressed by a common fraction $$\frac{m}{n}$$

where $m$ and $n$ are both integers. For the purposes of this invention two lengths are "substantially incommensurate" if their ratio $$\frac{m}{n}$$

when reduced to its lowest terms is such that $m$ and $n$ are large numbers. In this case degeneracy is possible only among very high order modes of oscillation.

What is claimed is:

1. An electrical cavity resonator comprising an orthogonal prism having its interior walls of electrically highly conductive material, said prism having one vertex thereof sheared off in a plane diagonal to the planes of the three contiguous orthogonal walls, the resulting opening being closed by a plate of electrically conducting material lying in the shearing plane, and coupling means passing through a wall of said resonator for exciting a plurality of modes of oscillation therein, said coupling being asymmetrically positioned in said wall.

2. An electrical cavity resonator for microwaves comprising a hollow orthogonal parallelepipedon having an interior surface of electrically conducting material and having at least two corners sheared off in planes diagonal to the three contiguous orthogonal walls, the resulting openings being closed by plane conducting surfaces, and coupling means in a wall of said resonator for exciting a plurality of modes of oscillation therein.

3. A selective electrical resonator comprising a substantially closed chamber having an interior surface of electrically highly conducting material, said chamber comprising an orthogonal prism with at least one corner sheared off in a plane diagonal to the three contiguous orthogonal walls and closed by a plate of electrically conducting material lying in that plane, the three orthogonal dimensions of the chamber being incommensurate in pairs, and coupling means connected to a wall of said resonator for exciting a plurality of modes of oscillation therein.

4. An electrical resonator comprising a substantially closed chamber having an interior surface of electrically highly conducting material, said chamber comprising a parallelepipedon with one corner sheared off in a diagonal plane and closed by a triangular plate of electrically conducting material lying in that plane, the diagonal plane having such a direction with reference to the parallelepipedon that two sides of the triangle are unequal, and coupling means associated with a wall of said resonator for exciting a plurality of modes of oscillation therein.

5. A selective electrical resonator comprising a substantially closed chamber having an interior surface of electrically conducting material, said chamber comprising a parallelepipedon with one corner sheared off in a diagonal plane and closed by a triangular plate of electrically conducting material lying in that plane, the diagonal plane having such a direction with reference to a parallelepipedon axis that no two sides are equal, and coupling means passing through a wall of said resonator for exciting a plurality of modes of oscillation therein.

6. An electrical resonator comprising a substantially closed chamber having an interior surface of electrically conducting material, said chamber comprising a parallelepipedon with two corners sheared off in a diagonal plane and each closed by a triangular plate of electrically conducting material lying in the respective shearing plane, the positions of the triangular plates with reference to the parallelepipedon being such that said triangular plates are unequal in dimension, and asymmetrically located coupling means passing through a wall of said resonator for exciting a plurality of modes of oscillation therein.

7. A multi-resonant microwave cavity resonator of high Q comprising a substantially closed chamber having boundary surfaces of electrically conducting material to confine an electromagnetic field therewithin, said chamber being symmetrical about three principal axes, means for increasing the number of its electromagnetic oscillation modes at a frequency corresponding to the natural frequency of the resonator comprising a boundary plate of conducting material closing said symmetrical surface at an opening produced therein by shearing off a vertex of said resonator, and an energy feed device, asymmetrically connected to one of said surfaces.

SERGEI A. SCHELKUNOFF.

REFERENCES CITED

The following references are of record in the file of this patent:

UNITED STATES PATENTS

| Number | Name | Date |
|---|---|---|
| 664,471 | Erkenswick | Dec. 25, 1900 |
| 2,197,737 | Appleton | Apr. 16, 1940 |
| 2,227,372 | Webster | Dec. 31, 1940 |
| 2,281,550 | Barrow | May 5, 1942 |
| 2,356,414 | Linder | Aug. 22, 1944 |
| 2,357,313 | Carter | Sept. 5, 1944 |
| 2,357,314 | Carter | Sept. 5, 1944 |
| 2,357,754 | Moll | Sept. 5, 1944 |